(12) United States Patent
Shibata et al.

(10) Patent No.: US 10,954,156 B1
(45) Date of Patent: Mar. 23, 2021

(54) OPTICAL GLASS

(71) Applicant: AGC Inc., Tokyo (JP)

(72) Inventors: Akira Shibata, Tokyo (JP); Shinichi Amma, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/006,199

(22) Filed: Aug. 28, 2020

Related U.S. Application Data

(63) Continuation of application No. PCT/JP2019/033347, filed on Aug. 26, 2019.

(51) Int. Cl.
*C03C 3/068* (2006.01)

(52) U.S. Cl.
CPC .................. *C03C 3/068* (2013.01)

(58) Field of Classification Search
CPC ...................................... C03C 3/068
See application file for complete search history.

(56) References Cited

FOREIGN PATENT DOCUMENTS

| | | |
|---|---|---|
| JP | 2010-030879 A | 2/2010 |
| JP | 2014-062024 A | 4/2014 |
| JP | 2016-121035 A | 7/2016 |
| JP | 2017-088482 A | 5/2017 |
| JP | 2019-020723 A | 2/2019 |

OTHER PUBLICATIONS

International Searching Authority, "International Search Report," issued in connection with International Patent Application No. PCT/JP2019/033347, dated Oct. 8, 2019.

International Searching Authority, "Written Opinion," issued in connection with International Patent Application No. PCT/JP2019/033347, dated Oct. 8, 2019.

*Primary Examiner* — Elizabeth A. Bolden

(74) *Attorney, Agent, or Firm* — Foley & Lardner LLP

(57) ABSTRACT

Provided is an optical glass having a high refractive index and high light transmittance. The optical glass contains, in terms of mol % based on oxides, $SiO_2$: 9.0% to 11.0%, $B_2O_3$: 22.0% to 24.0%, $La_2O_3$: 18.0% to 20.0%, and $TiO_2$: 30.0% to 31.0%.

7 Claims, No Drawings

OPTICAL GLASS

CROSS-REFERENCE TO RELATED APPLICATION(S)

This application is a continuation of International Application No. PCT/JP2019/033347, filed on Aug. 26, 2019, the entire contents of which are incorporated herein by reference.

FIELD

The present invention relates to an optical glass, and in particular relates to an optical glass to be used for a light guide plate.

BACKGROUND

In recent years, head mounted displays (HMD) compatible with, for example, augmented reality (AR), virtual reality (VR), and mixed reality (MR) have been a topic of interest. As a light guide plate for this optical device, it is known to use a glass having a high refractive index. For a light guide plate for HMD, the thickness of the light guide plate and a refractive index, which greatly affects flexibility in the total design of HMD, are particularly important. For example, Patent Literature 1 discloses a high-refractive-index glass for HMD, the glass having a refractive index of approximately 2.0.

CITATION LIST

Patent Literature

Patent Literature 1: Japanese Laid-open Patent Publication No. 2019-20723

SUMMARY

Technical Problem

However, in recent years, higher performance has been required for products, and accordingly, higher light transmittance of glass has been required. The optical glass described in Patent Literature 1 has an insufficient internal transmittance, that is, approximately 0.6 in the blue wavelength range.

Under such circumstances, an optical glass having a high refractive index and high light transmittance has been desired.

Solution to Problem

An optical glass of the present invention comprises, in terms of mol % based on oxides:
$SiO_2$: 9.0% to 11.0%;
$B_2O_3$: 22.0% to 24.0%;
$La_2O_3$: 18.0% to 20.0%; and
$TiO_2$: 30.0% to 31.0%.

Advantageous Effects of Invention

According to the present invention, an optical glass having a high refractive index and high light transmittance can be industrially produced. In particular, the present invention is suitable for continuous production.

DESCRIPTION OF EMBODIMENTS

Descriptions are given of an optical glass of the present invention. The shape of the optical glass is not particularly limited. For example, the optical glass may be shaped like a plate.

[Component of Optical Glass]

The optical glass of the present invention includes a combination of essential components and optional components. The essential components are essentially contained in the optical glass and offer important functions in performance. The optional components are used if needed. Unless there is a specific description in the present specification, % means mol % based on oxides. A numerical range includes a rounded-of range. A numerical range "A to B" means "A or more and B or less".

[Essential Component]

<$SiO_2$>

$SiO_2$ is a component that forms glass, gives strength and cracking resistance to glass, and enhances the stability and chemical durability of glass. The optical glass of the present embodiment has a $SiO_2$ content of 9.0% to 11.0%, and preferably 9.0% to 10.0%. The optical glass having a $SiO_2$ content within the above-mentioned range can acquire both high strength and a high refractive index.

<$B_2O_3$>

$B_2O_3$ is a component that provides a low glass transition temperature (Tg) and enhances mechanical properties such as the strength and the crack resistance of glass. The optical glass of the present embodiment has a $B_2O_3$ content of 22.0% to 24.0%, and preferably 22.5% to 23.5%. The optical glass having a $B_2O_3$ content within the above-mentioned range can acquire both high strength and a high refractive index.

<$La_2O_3$>

$La_2O_3$ is a component that contributes to increasing the refractive index of the present optical glass and lowering the devitrification temperature of the present optical glass. The optical glass of the present embodiment has a $La_2O_3$ content of 18.0% to 20.0%, and preferably 18.5% to 19.5%. The optical glass having a $La_2O_3$ content within the above-mentioned range can acquire both a high refractive index and a low devitrification temperature.

<$TiO_2$>

$TiO_2$ is a component that, typically, increases the refractive index of glass and enlarges the dispersion of glass, in the present optical glass, $TiO_2$ is a component that contributes to, in particular, the devitrification temperature and light transmittance of the optical glass. The optical glass of the present embodiment has a $TiO_2$ content of 30.0% to 31.0%, and preferably 30.3% to 30.7%. The optical glass having a $TiO_2$ content within the above-mentioned range can acquire both a high transmittance and a low devitrification temperature.

[Optional Component]

<$Y_2O_3$>

The optical glass of the present embodiment preferably contains $Y_2O_3$. $Y_2O_3$ is a component that contributes to increasing the refractive index of the present optical glass and lowering the devitrification temperature of the present optical glass. In the case where the optical glass of the present embodiment contains $Y_2O_3$, the $Y_2O_3$ content of the optical glass is preferably 3.0% to 5.0%, and particularly preferably 3.5% to 4.5%. The optical glass having a $Y_2O_3$ content within the above-mentioned range can acquire both a high refractive index and a low devitrification temperature.

<WO$_3$>

The optical glass of the present embodiment preferably contains WO$_3$. WO$_3$ is a component that inhibits the devitrification of glass and contributes to the coloring of glass. Therefore, a too large amount of WO$_3$ causes a decrease in light transmittance. Hence, in the case where the optical glass of the present embodiment contains WO$_3$, the WO$_3$ content of the optical glass is preferably 0.1% to 0.4%, and particularly preferably 0.2% to 0.3%. The optical glass having a WO$_3$ content within the above-mentioned range can acquire both a high transmittance and a low devitrification temperature.

<Nb$_2$O$_5$>

The optical glass of the present embodiment preferably contains Nb$_2$O$_5$. Nb$_2$O$_5$ is a component that contributes to increasing the refractive index of the present optical glass and lowering the devitrification temperature of the present optical glass. In the case where the optical glass of the present embodiment contains Nb$_2$O$_5$, the Nb$_2$O$_5$ content of the optical glass is preferably 2.5% to 4.0%, and particularly preferably 3.0% to 3.5%. The optical glass having a Nb$_2$O$_5$ content within the above-mentioned range can acquire both a high refractive index and a low devitrification temperature.

<ZrO$_2$>

The optical glass of the present embodiment preferably contains ZrO$_2$. ZrO$_2$ is a component that increases the refractive index of glass and enhances the chemical durability of glass. In the case where the optical glass of the present embodiment contains ZrO$_2$, the ZrO$_2$ content of the optical glass is preferably 5.0% to 8.0%, and particularly preferably 6.0% to 7.0%. The optical glass having a ZrO$_2$ content within the above-mentioned range can acquire both high durability and a high refractive index.

<Gd$_2$O$_3$>

The optical glass of the present embodiment preferably contains Gd$_2$O$_3$. Gd$_2$O$_3$ is a component that contributes to increasing the refractive index of the present optical glass and lowering the devitrification temperature of the present optical glass. In the case where the optical glass of the present embodiment contains Gd$_2$O$_3$, the Gd$_2$O$_3$ content of the optical glass is preferably 3.0% to 5.0%, and particularly preferably 3.5% to 4.5%. The optical glass having a Gd$_2$O$_3$ content within the above-mentioned range can acquire both a high refractive index and a low devitrification temperature.

<Other Optional Components>

Besides the above-mentioned components, the optical glass of the present embodiment may include a minor component and an additive that are typically used for the production of optical glasses, without impairing the effects of the present invention.

[Composition of Optical Glass]

The optical glass of the present embodiment contains the following compounds in mol % based on oxides.

SiO$_2$: 9.0% to 11.0%
B$_2$O$_3$: 22.0% to 24.0%
La$_2$O$_3$: 18.0% to 20.0%
TiO$_2$: 30.0% to 31.0%

The optical glass of the present embodiment preferably contains the following compounds in mol % based on oxides.

SiO$_2$: 9.0% to 11.0%
B$_2$O$_3$: 22.0% to 24.0%
Y$_2$O$_3$: 3.0% to 5.0%
TiO$_2$: 30.0% to 31.0%
WO$_3$: 0.1% to 0.4%
Nb$_2$O$_5$: 2.5% to 4.0%
La$_2$O$_3$: 18.0% to 20.0%
ZrO$_2$: 5.0% to 8.0%
Gd$_2$O$_3$: 3.0% to 5.0%

The optical glass of the present embodiment particularly preferably contains the following compounds in mol % based on oxides.

SiO$_2$: 9.0% to 10.0%
B$_2$O$_3$: 22.5% to 23.5%
Y$_2$O$_3$: 3.5% to 4.5%
TiO$_2$: 30.3% to 30.7%
WO$_3$: 0.2% to 0.3%
Nb$_2$O$_5$: 3.0% to 3.5%
La$_2$O$_3$: 18.5% to 19.5%
ZrO$_2$: 6.0% to 7.0%
Gd$_2$O$_3$: 3.5% to 4.5%

Furthermore, the composition of the optical glass of the present embodiment is preferably in a range of 99.5%≤(SiO$_2$+B$_2$O$_3$+Y$_2$O$_3$+TiO$_2$+WO$_3$+Nb$_2$O$_5$+La$_2$O$_3$+ZrO$_2$+Gd$_2$O$_3$)≤100.0%, and particularly preferably (SiO$_2$+B$_2$O$_3$+Y$_2$O$_3$+TiO$_2$+WO$_3$+Nb$_2$O$_5$+La$_2$O$_3$+ZrO$_2$+Gd$_2$O$_3$)=100.0%, in mol % based on oxides (note that the inclusion of inevitable impurities due to manufacture is allowed).

The optical glass having a composition within the above-mentioned range can satisfy all of a high refractive index, light transmittance, and a low devitrification temperature.

Furthermore, the optical glass of the present embodiment preferably does not contain ZnO in an amount larger than the amount of impurities inevitably contained due to manufacture. If containing ZnO, the present optical glass is easily devitrified.

Furthermore, the optical glass of the present embodiment preferably does not contain alkali metal in an amount larger than the amount of impurities inevitably contained due to manufacture. If containing alkali metal, the present optical glass has lower weather resistance and lower chemical resistance.

[Optical Glass]

The optical glass of the present embodiment has a refractive index nd of preferably 1.90 to 2.10, and particularly preferably 1.95 to 2.05. In particular, in the case where the optical glass of the present invention is used for a light guide plate, the optical glass having a refractive index nd in the above-mentioned range makes it possible to design a thinner light guide plate.

The optical glass of the present embodiment has an internal transmittance at a wavelength of 450 nm of preferably 88.0% or higher, and particularly preferably 90.0% or higher. The optical glass having an internal transmittance in the above-mentioned range can substantially prevent the attenuation of blue light in a light guide plate, and can substantially prevent a picture projected on HMD from looking yellow.

The optical glass of the present embodiment has a devitrification temperature of preferably less than 1,170° C., and particularly preferably less than 1,150° C. The optical glass having a devitrification temperature in the above-mentioned range reduces devitrification caused by crystal formation during glass manufacture, and thereby makes glass manufacture easier.

[Method for Producing Optical Glass]

A method for producing the optical glass of the present embodiment is not limited to a particular method, and existing methods for producing plate glasses can be applied. For example, well-known methods, such as float method, fusion method, and roll-out method, can be used.

EXAMPLES

Hereinafter, detailed descriptions will be given of Examples and Comparative Examples of the present invention. As long as the advantageous effects of the present invention are exhibited, the embodiments may be suitably modified.

<Measurement Method>

[Devitrification Temperature]

A devitrification temperatures T of the optical glass of each of Examples and Comparative Examples was measured on the following conditions.

Raw materials of compositions listed in Table 1 were melted in a platinum crucible at 1,250° C. for 2 hours to form a uniform molten glass. The molten glass was casted into a mold (length×width×height=60 mm×50 mm×30 mm) heated to 200° C. to obtain a glass block. The glass block was put into water of ordinary temperature to be pulverized, so that cullet measuring approximately 2 mm per side was obtained. From this cullet, 5 g of cullet was taken as an evaluation sample.

The evaluation sample was put into a platinum plate, and heated for 16 hours in an electric furnace set at a predetermined temperature of 1,100° C. to 1,200° C. to melt the sample. After a lapse of the 16 hours, the sample was taken out of the electric furnace, and, while the sample was naturally allowed to cool, whether the sample was precipitated as crystals was observed by using an optical microscope. Conditions on which crystals had been observed were recorded, and the highest temperature among set temperatures of the electric furnace under the conditions is regarded as a devitrification temperature T. For the optical glasses of Examples and Comparative Examples, devitrification temperatures T of evaluation samples are judged on the following criteria, and it is determined that a devitrification temperature T with a double circle or a circle is acceptable.

Double Circle: T<1,150° C.
Circle: 1,150 T≤1,170° C.
Cross: 1,170° C.≤T

[Light Transmittance]

A light transmittance X was measured on the following conditions.

Two types of glass plates were used, obtained in Examples and the likes and having a size of length×width=30 mm×30 mm, one type of the glass plates having a plate thickness of 10 mm and the other type of the glass plates having a plate thickness of 1 mm. The light transmittance X at a wavelength of 450 nm of a glass plate having a plate thickness of 10 mm was measured by a spectrophotometer (U-4100, manufactured by Hitachi High-Technologies Corporation) (the light transmittance in the present embodiment means an internal transmittance except a reflection loss in front and back faces). For the optical glasses of Examples and Comparative Examples, the light transmittance X of each of the evaluation samples is judged on the following criteria, and it is determined that a light transmittance X marked with a double circle or a circle is acceptable.

Double Circle: 90.0%≤X
Circle: 88.0%≤X<90.0%
Cross: 88.0<X

[Refractive Index]

The refractive index (nd) of each of the glass plates obtained in Examples and the likes and having a size of length×width×plate thickness=30 mm×30 mm×10 mm was measured by a refractometer (KPR-2000, manufactured by Kalnew).

Example 1

A raw material of a composition listed in Table 1 was melted in a platinum crucible at 1,250° C. for 2 hours to obtain a uniform molten glass. The molten glass was poured into a mold (length×width×height=60 mm×50 mm×30 mm) heated to 200° C. to obtain a glass block.

Next, by the use of a cutting machine (a small-sized cutting machine manufactured by Maruto Instrument Co., Ltd.), the glass block was cut into pieces each having a size of length×width=30 mm×30 mm, and the resulting pieces were subjected to plate thickness adjustment and surface polishing by the use of a grinding machine (SGM-6301, manufactured by SHUWA Industry Company Limited) and an one-side polishing machine (EJ-380IN, manufactured by Engis Japan Corporation) to produce glass plates having a size of length×width=30 mm×30 mm and a plate thickness of 10 mm or 1 mm. These glass plates were subjected to various evaluations. Table 1 lists evaluation results.

Grinding Condition: The glass plates were ground at 2.0 μm/sec by the use of a #100 diamond wheel, and then ground at 1.0 μm/sec by the use of a #1000 diamond wheel, and subsequently ground at 0.5 μm/sec by the use of a #2000 diamond wheel.

Polishing Condition: abrasive (cerium oxide), the number of revolutions (80 rpm for 10 minutes)

Examples 2 to 3, Comparative Examples 1 to 2

The same operation as in Example 1 was performed, except that the condition was changed to conditions listed in Table 1.

TABLE 1

| | Composition (mol %) | | | | | | | | | Evaluation | | | | |
|---|---|---|---|---|---|---|---|---|---|---|---|---|---|---|
| | | | | | | | | | | | Devitrification Temperature | | Light Transmittance | |
| | $SiO_2$ | $B_2O_3$ | $Y_2O_3$ | $TiO_2$ | $WO_3$ | $Nb_2O_5$ | $La_2O_3$ | $ZrO_2$ | $Gd_2O_3$ | nd | ° C. | Judgment | % | Judgment |
| Example 1 | 9.5 | 23.1 | 4.0 | 30.5 | 0.25 | 3.3 | 19.0 | 6.5 | 3.9 | 2.00 | 1138 | ◎ | 92.2 | ◎ |
| Example 2 | 9.8 | 23.1 | 3.7 | 31.0 | 0.25 | 3.2 | 19.0 | 6.4 | 3.7 | 2.00 | 1125 | ◎ | 88.7 | ○ |
| Example 3 | 9.3 | 23.1 | 4.3 | 30.0 | 0.25 | 3.4 | 19.1 | 6.5 | 4.1 | 2.00 | 1155 | ○ | 92.8 | ◎ |
| Comparative Example 1 | 10.0 | 23.1 | 3.4 | 31.5 | 0.25 | 3.1 | 18.9 | 6.3 | 3.5 | 2.00 | 1113 | ◎ | 87.0 | × |
| Comparative Example 2 | 9.0 | 23.1 | 4.6 | 29.5 | 0.25 | 3.5 | 19.1 | 6.6 | 4.4 | 2.00 | 1175 | × | 92.3 | ◎ |

The invention claimed is:

1. An optical glass comprising, in terms of mol % based on oxides:
$SiO_2$: 9.0% to 11.0%;
$B_2O_3$: 22.0% to 24.0%;
$La_2O_3$: 18.0% to 20.0%; and
$TiO_2$: 30.0% to 31.0%.

2. The optical glass according to claim 1, further comprising, in terms of mol % based on oxides:
$Y_2O_3$: 3.0% to 5.0%;
$WO_3$: 0.1% to 0.4%;
$Nb_2O_5$: 2.5% to 4.0%;
$ZrO_2$: 5.0% to 8.0%; and
$Gd_2O_3$: 3.0% to 5.0%.

3. The optical glass according to claim 2, satisfying, in terms of mol % based on oxides:
$SiO_2$: 9.0% to 10.0%;
$B_2O_3$: 22.5% to 23.5%;
$Y_2O_3$: 3.5% to 4.5%;
$TiO_2$: 30.3% to 30.7%;
$WO_3$: 0.2% to 0.3%;
$Nb_2O_5$: 3.0% to 3.5%;
$La_2O_3$: 18.5% to 19.5%;
$ZrO_2$: 6.0% to 7.0%; and
$Gd_2O_3$: 3.5% to 4.5%.

4. The optical glass according to claim 1, having a composition in a range of 99.5% $(SiO_2+B_2O_3+Y_2O_3+TiO_2+WO_3+Nb_2O_5+La_2O_3+ZrO_2+Gd_2O_3) \leq 100.0\%$, in terms of mol % based on oxides.

5. The optical glass according to claim 1, having a refractive index in a range of 1.90 to 2.10.

6. The optical glass according to claim 1, having an internal transmittance at 450 nm of 88.0% or higher.

7. The optical glass according to claim 1, having a devitrification temperature T in a range of T<1,170° C.

* * * * *

UNITED STATES PATENT AND TRADEMARK OFFICE
CERTIFICATE OF CORRECTION

PATENT NO. : 10,954,156 B1
APPLICATION NO. : 17/006199
DATED : March 23, 2021
INVENTOR(S) : Akira Shibata et al.

Page 1 of 1

It is certified that error appears in the above-identified patent and that said Letters Patent is hereby corrected as shown below:

In the Claims

Claim 4, Column 7, Lines 20-21:
Please delete:
"99.5% $(SiO_2 + B_2O_3 + Y_2O_3 + TiO_2 + WO_3 + Nb_2O_5 + La_2O_3 + ZrO_2 + Gd_2O_3) \leq 100.0\%$"
Please replace with:
99.5% $\leq (SiO_2 + B_2O_3 + Y_2O_3 + TiO_2 + WO_3 + Nb_2O_5 + La_2O_3 + ZrO_2 + Gd_2O_3) \leq 100.0\%$ Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*